US012669586B2

(12) United States Patent
  Sachkov

(10) Patent No.: US 12,669,586 B2
(45) Date of Patent: Jun. 30, 2026

(54) TWO-CHANNEL LIDAR SYSTEM

(71) Applicant: YANDEX SELF DRIVING GROUP LLC, Moscow (RU)

(72) Inventor: Andrey Vladimirovich Sachkov, Moscow (RU)

(73) Assignee: Y.E. Hub Armenia LLC, Yerevan (AM)

(*) Notice: Subject to any disclaimer, the term of this patent is extended or adjusted under 35 U.S.C. 154(b) by 891 days.

(21) Appl. No.: 17/992,117

(22) Filed: Nov. 22, 2022

(65) Prior Publication Data
  US 2023/0161008 A1     May 25, 2023

(30) Foreign Application Priority Data

Nov. 22, 2021     (RU) ........................... RU2021133952

(51) Int. Cl.
  *G01S 7/48*          (2006.01)
  *G01S 7/481*         (2006.01)
  *G01S 17/931*        (2020.01)

(52) U.S. Cl.
  CPC .......... *G01S 7/4813* (2013.01); *G01S 7/4814* (2013.01); *G01S 7/4817* (2013.01); *G01S 17/931* (2020.01)

(58) Field of Classification Search
  None
  See application file for complete search history.

(56) References Cited

U.S. PATENT DOCUMENTS

| | | | |
|---|---|---|---|
| 10,267,898 B2 | 4/2019 | Campbell et al. | |
| 10,274,599 B2 | 4/2019 | Schmalenberg | |
| 11,606,517 B1 * | 3/2023 | Sharma ................. | G01S 17/931 |
| 2006/0044451 A1 | 3/2006 | Liang et al. | |
| 2018/0284237 A1 | 10/2018 | Campbell et al. | |
| 2020/0132851 A1 | 4/2020 | Gassend et al. | |
| 2021/0011128 A1 | 1/2021 | Shi et al. | |
| 2021/0349196 A1 | 11/2021 | Wang et al. | |

OTHER PUBLICATIONS

European Search Report dated Mar. 27, 2023 issued in respect of the European Patent Application No. 22208600.1.

* cited by examiner

*Primary Examiner* — Hovhannes Baghdasaryan
(74) *Attorney, Agent, or Firm* — BCF LLP

(57) ABSTRACT

A two-channel LIDAR system, including a housing; a first and second subsystem disposed in the housing including a light source, a detector, and a scanning mirror, the scanning mirror being arranged to: receive a light beam from the light source and scan the light beam in a first axial direction, and direct a reflected light beam received thereon to the detector, the reflected light beam being light from the light beam being incident on and reflected from surrounding objects; a scanning prism disposed in a forward, central portion of the housing at least partially between the first and second scanning mirror, the scanning prism being arranged to scan light incident thereupon in a second axial direction; and an adjustable blocking element being disposed forward of the scanning prism, the adjustable blocking element having a selectively adjustable width for selectively reducing light entering the housing.

13 Claims, 6 Drawing Sheets

TWO-CHANNEL LIDAR SYSTEM

CROSS-REFERENCE

The present application claims priority to Russian Patent Application No. 2021133952, entitled "Two-Channel Lidar System", filed Nov. 22, 2021, the entirety of which is incorporated herein by reference.

TECHNICAL FIELD

The present technology relates generally to Light Detection and Ranging (LIDAR) systems and methods for detecting objects in a surrounding environment of an autonomous vehicle; and in particular, to multichannel LIDAR systems.

BACKGROUND

In devices using LIDAR systems, for example autonomously driving vehicles, the dual concerns of accuracy and density of information often drive LIDAR system adaption. For example, LIDAR systems having two channels (two light sources and/or two detection paths) and a central scanning system have been proposed for increasing the data collected by a given system.

Broadly, light is scanned across the surrounding area and light beams reflected from surrounding objects are collected by the LIDAR system. In the system mentioned above, the light hits a central prism which relays the light back to the channel (including the corresponding detector) from which the beam initially emanated.

Sometimes, however, light beam from one channel and reflected from the surrounding objects comes back to another channel. This phenomenon is known as inter-channel interference and leads in some cases to phantom images. Additional scatter from the surrounding objects may enter the system as well, further causing noise or false data to appear.

There remains therefore a desire for improved LIDAR systems.

SUMMARY

Therefore, there is a need for systems and methods which avoid, reduce or overcome the limitations of the prior art.

In accordance with at least one broad aspect of the present technology, there is provided a multichannel LIDAR system including different blocking elements to aid in reducing crosstalk, inter-channel interference, and some other noise sources. Inter-channel interference can be difficult to correct, as the incorrect beams enter the LIDAR system at a very small angular deviation from the true signal. By the present technology, a series of baffles generally parallel to the intended ray direction are included between each of two galvo mirror arrangements and a central prism used to scan both channels. A central adjustable blocking element is also included, forward of the central prism. The central blocking element is adjusted to trim stray light and/or rays causing inter-channel interference. The adjustable blocking element is generally configured during a calibration stage, although the blocking element could be adjusted in response to a variation in performance. Additional blocking elements partially surrounding the galvo mirrors on each side of the system are also included to impede stray light from surroundings from reaching the detectors, via the galvo mirrors, without having been directed by the prism.

In accordance with a first broad aspect of the present technology, there is provided a two-channel LIDAR system, including a housing; a first subsystem disposed in the housing, the first subsystem including: a first light source, a first detector, and a first scanning mirror disposed in the housing, the first scanning mirror being arranged to: receive a first light beam from the first light source and scan the first light beam in a first axial direction, and direct a first reflected light beam received thereon to the first detector, the first reflected light beam being light from the first light beam being incident on and reflected from surrounding objects; a second subsystem disposed in the housing, the second subsystem including: a second light source, a second detector, and a second scanning mirror disposed in the housing arranged to: receive a second light beam from the second light source and scan the second light beam in the first axial direction, and direct a second reflected light beam received thereon to the second detector, the second reflected light beam being light from the second light beam being incident on and reflected from surrounding objects; a scanning prism disposed in a forward, central portion of the housing at least partially between the first scanning mirror and the second scanning mirror, the scanning prism being arranged to scan light from the first scanning mirror and the second scanning mirror incident thereupon in a second axial direction; and an adjustable blocking element connected to the housing, the adjustable blocking element being disposed forward of the scanning prism, the adjustable blocking element having a selectively adjustable width for selectively reducing light entering the housing.

In some embodiments, the housing includes: a housing body; a first scanning window defined in the housing body, the first scanning window being disposed forward of the first scanning mirror, and a second scanning window defined in the housing body, the second scanning window being disposed forward of the second scanning mirror; and the adjustable blocking element is disposed laterally between the first scanning window and the second scanning window.

In some embodiments, the housing body is formed from opaque material to block stray light.

In some embodiments, the adjustable blocking element is arranged to selectively block: an inner edge portion of the first scanning window; and an inner edge portion of the second scanning window.

In some embodiments, the system further includes a first blocking element at least partially surrounding the first scanning mirror; and a second blocking element at least partially surrounding the second scanning mirror.

In some embodiments, the adjustable blocking element is selectively positionable in at least: a retracted position; and an extended position.

In some embodiments, the first blocking element is disposed between the first scanning window and the first scanning mirror; the first blocking element is configured to block stray light from an exterior of the housing from being incident on the first scanning mirror; the second blocking element is disposed between the second scanning window and the second scanning mirror; and the second blocking element is configured to block stray light from the exterior of the housing from being incident on the second scanning mirror.

In some embodiments, the system further includes at least one first inner baffle plate disposed laterally between the scanning prism and the first scanning mirror; at least one first outer baffle plate disposed laterally between the scanning prism and the first scanning mirror, the at least one outer baffle plate being disposed forward of the at least one first inner baffle plate; at least one second inner baffle plate disposed laterally between the scanning prism and the second scanning mirror; and at least one second outer baffle plate disposed laterally between the scanning prism and the second scanning mirror, the at least one outer baffle plate being disposed forward of the at least one first inner baffle plate.

In some embodiments, the at least one first inner baffle plate and the at least one first outer baffle plate extend perpendicularly to an axis of rotation of the first scanning mirror; and the at least one second inner baffle plate and the at least one second outer baffle plate extend perpendicularly to an axis of rotation of the second scanning mirror.

In some embodiments, the at least one first inner baffle plate includes a pair of first inner baffle plates; the at least one first outer baffle plate includes a pair of first outer baffle plates; the at least one second inner baffle plate includes a pair of first inner baffle plates; and the at least one second outer baffle plate includes a pair of second outer baffle plates.

In some embodiments, the system further includes a first baffle rack supporting the pair of first inner baffle plates and the pair of first outer baffle plates; and a second baffle rack supporting the pair of second inner baffle plates and the pair of second outer baffle plates.

In some embodiments, the at least one first inner baffle plate includes a first shorter inner baffle plate and a first longer inner baffle plate; the at least one first outer baffle plate includes a first shorter outer baffle plate and a first longer outer baffle plate; the at least one second inner baffle plate includes a second shorter inner baffle plate and a second longer inner baffle plate; and the at least one second outer baffle plate includes a second shorter outer baffle plate and a second longer outer baffle plate.

In some embodiments, the at least one first inner baffle plate and the at least one first outer baffle plate are arranged to at least partially block stray light from the second light source from reaching the first scanning mirror; and the at least one second inner baffle plate and the at least one second outer baffle plate are arranged to at least partially block stray light from the first light source from reaching the second scanning mirror.

In some embodiments, the system further includes a laser source disposed in the housing; and wherein: light of the first light source is generated by the laser source, and light of the second light source is generated by the laser source.

In the context of the present specification, the term "light source" broadly refers to any device configured to emit radiation such as a radiation signal in the form of a beam, for example, without limitation, a light beam including radiation of one or more respective wavelengths within the electromagnetic spectrum. In one example, the light source can be a "laser source". Thus, the light sources referenced could include one or more lasers such as a solid-state laser, laser diode, a high power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser sources may emit light beams in differing formats, such as light pulses, continuous wave (CW), quasi-CW, and so on. In some non-limiting examples, the laser sources may include a laser diode configured to emit light at a wavelength between about 650 nm and 1150 nm. Alternatively, the light sources may include a laser diode configured to emit light beams at a wavelength between about 800 nm and about 1000 nm, between about 850 nm and about 950 nm, between about 1300 nm and about 1600 nm, or in between any other suitable range. For example, depending on the particular components, the light sources could vary from 400 nm to 2000 nm. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest (ROI). The output beams may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected or scattered from one or more objects in the ROI. The "input beam" may also be referred to as a radiation beam or light beam. By reflected is meant that at least a portion of the output beam incident on one or more objects in the ROI bounces off the one or more objects. The input beams may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" or "environment" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" (ROI) may broadly include a portion of the observable environment of a LIDAR system in which the one or more objects may be detected. It is noted that the region of interest of the LIDAR system may be affected by various conditions such as but not limited to: an orientation of the LIDAR system (e.g. direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The ROI of the LIDAR the system may be defined, for example, by a plane angle or a solid angle. In one example, the ROI may also be defined within a certain distance range (e.g. up to 200 m or so).

In the context of the present specification, "controller" or "electronic device" is any computer hardware that is capable of running software appropriate to the relevant task at hand and/or controlling or managing functionalities of connected components. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

It should be noted that the Figures may not be drawn to scale unless otherwise indicated.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

With these fundamentals in place, we will now consider some non-limiting examples to illustrate various implementations of aspects of the present technology.

Figure 1:
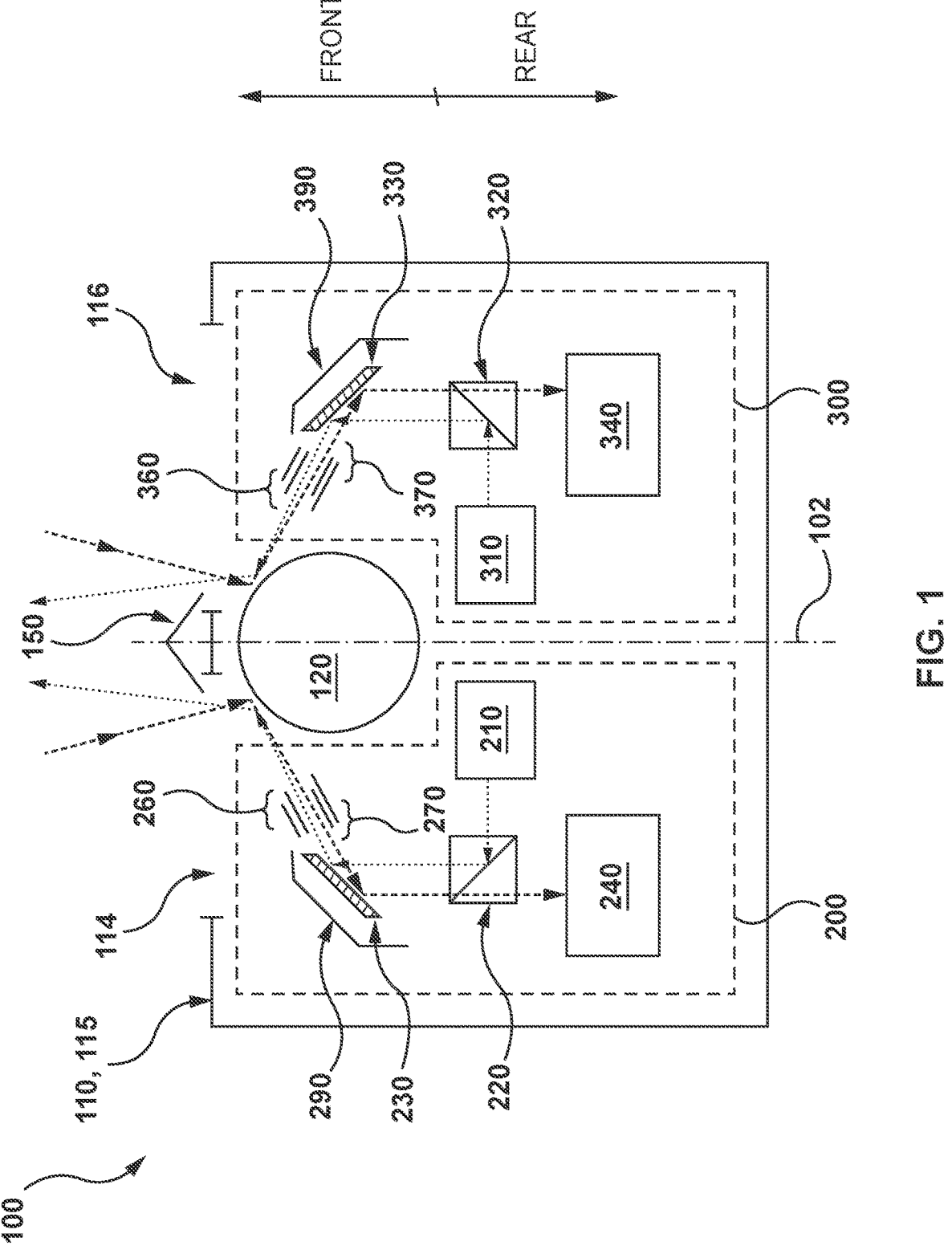
FIG. 1 depicts a schematic diagram of a LIDAR system according to one non-limiting embodiment of the present technology.

With reference to FIG. 1, a light detection and ranging (LIDAR) system 100 according to at least some non-limiting embodiments of the present technology is illustrated schematically. In at least some implementations of the LIDAR system 100, it is contemplated that the system 100 could be included in a vehicle (not shown). The vehicle could, for instance, be user operated or a driver-less vehicle. In some non-limiting embodiments of the present technology, it is contemplated that such a vehicle including the LIDAR system 100 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

The LIDAR system 100 is specifically a two-channel LIDAR system 100 including two subsystems, detailed below, which form the two channels of the system 100. The terminology of two-channel refers herein to two light source and detector pairs investigating a generally same or overlapping area. The percentage overlap between a field of view of each channel could vary in different embodiments. It is contemplated, however, that at least some aspects of the present technology could be applied to LIDAR systems having one channel or more than two channels.

Figure 2:
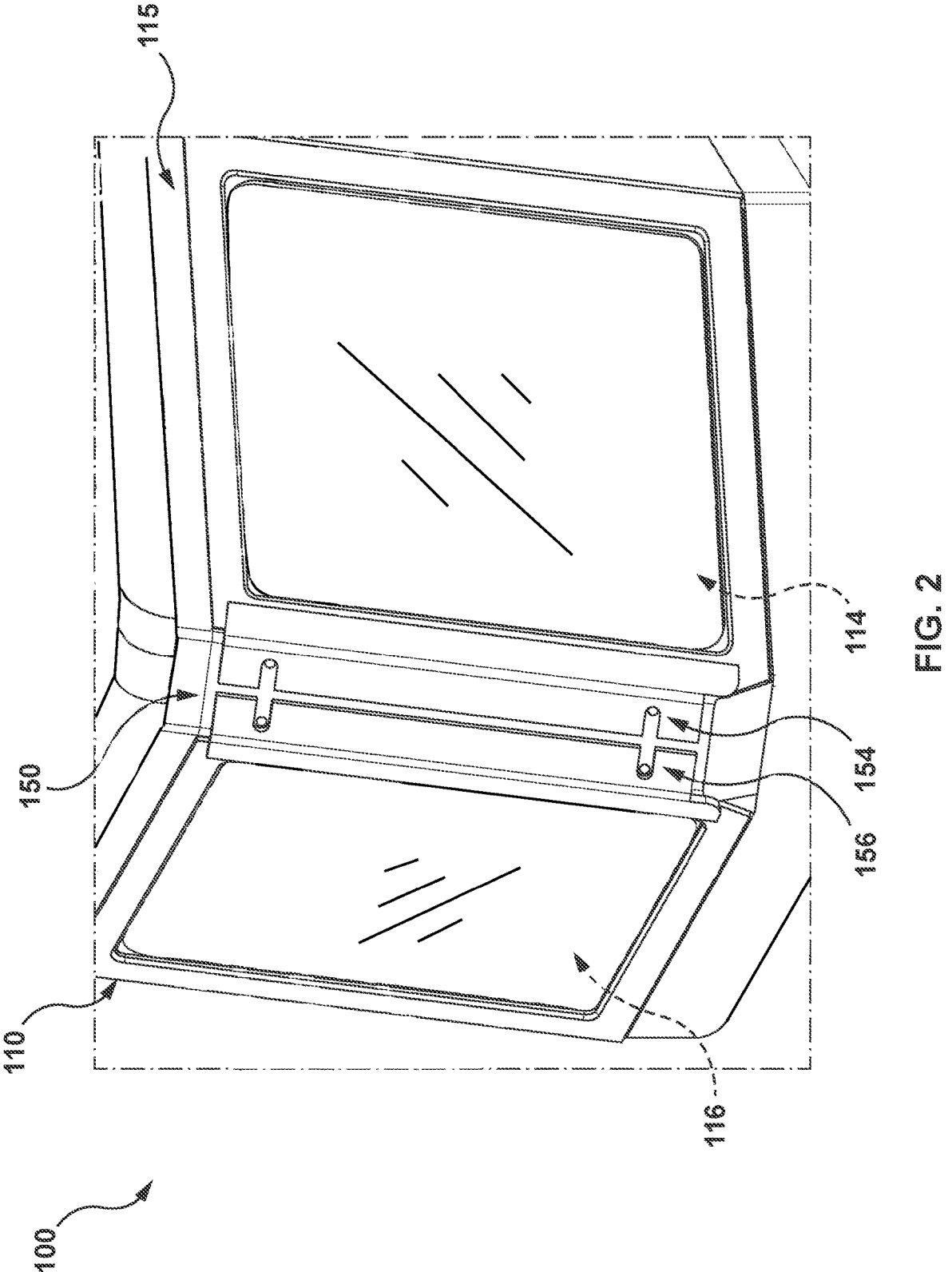
FIG. 2 is a front, left side partial perspective view of the LIDAR system of FIG. 1, with an adjustable blocking element shown in a retracted position.
Figure 3:
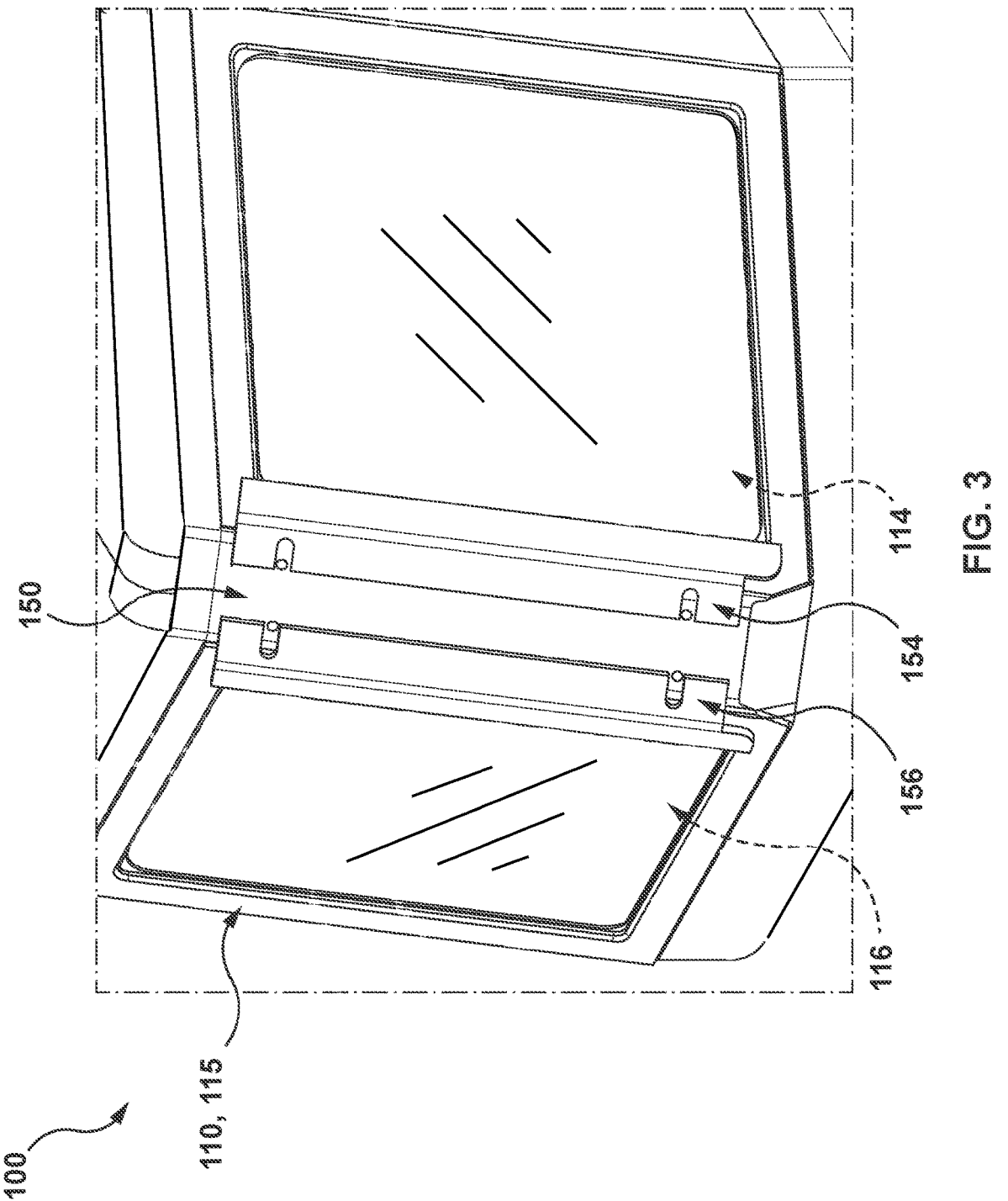
FIG. 3 is the front, left side partial perspective view of the LIDAR system of FIG. 2, with the adjustable blocking element shown in an extended position.

With additional reference to FIGS. 2 and 3, the system 100 includes a housing 110. The housing 110 encases the LIDAR components (detailed further below) to provide at least partial protection of the components therein. The housing 110 is formed by an opaque housing body 115, formed from opaque material to block stray light. In the current non-limiting example, the housing body 115 is formed from aluminum. It is contemplated that different opaque materials could be used.

The housing 110 includes a first scanning window 114 defined in the housing body 115 and a second scanning window 116 defined in the housing body 115. The windows 114, 116 are disposed on opposite sides of a longitudinal center line 102 of the housing 110. The windows 114, 116 are made from anti-reflection glass disposed in openings of the housing body 115, although the particular material is chosen based on at least the wavelength used in order to provide sufficient transmission. It is contemplated that the windows 114, 116 could be apertures defined by the housing body 115, where the glass or transparent material is omitted.

The system 100 includes two illumination-detection subsystems 200, 300 disposed on each of a left side and a right side of the housing 110 for forming the two channels of information mentioned above; details of the subsystems 200, 300 are described below.

The system 100 also includes a central scanning prism 120 disposed in a forward, central portion of the housing 110. The scanning prism 120 is arranged to scan light from each of the left and right sides subsystems 200, 300 across a horizontal axis, and to collect light reflected or scattered from objects in the surrounding environment back to the left and right subsystems 200, 300. The prism 120 is illustrated schematically is a circularly form; different forms are contemplated, and the present technology is not limited to any particular configuration. The prism 120 could be implemented in different forms, including but not limited to: a prism with a variety of number of faces, prisms with a polygon in the intersectional view, and prisms with regular or irregular pyramidal shape.

The left illumination-detection subsystem 200, also referred to as a first subsystem 200, is disposed in the housing 110 generally to the left of the longitudinal center line 102 of the housing 110. It is contemplated, however, that some components or portions thereof of the subsystem 200 could extend onto a right side of the housing 110.

The subsystem 200 includes a first light source 210 disposed in a left side of the housing 110. In the present embodiment, the light source 210 is a laser source 210 but the specific details for any given embodiment could vary.

The subsystem 200 includes a first scanning mirror 230 disposed in the housing 110, specifically in a forward, left portion of the housing 110. Specifically, the scanning window 114 is disposed forward of the scanning mirror 230, although the specific amount of lateral overlap could vary. In the illustrated embodiment, the scanning mirror 230 is a galvanometer-based scanning mirror, also referred to as a galvo mirror 230. It is contemplated that the scanning mirror 230 could be implemented in various forms. In certain non-limiting embodiments of the present technology, the scanning mirror 230 may further include a variety of other optical components and/or mechanical-type components for performing the scanning of the output beam from the light source 210. For example, the scanning mirror 230 may include one or more mirrors, prisms, lenses, MEM components, piezoelectric components, optical fibers, splitters, diffractive elements, collimating elements, and the like.

The scanning mirror 230 is arranged to receive a first light beam from the light source 210 and scan the first light beam in a first axial direction, specifically along a vertical axis, onto the scanning prism 120. The combined motion of the scanning mirror 230 and the scanning prism 120 then scans the light across a generally rectangular grid over the area surrounding the LIDAR system 100.

Light from the light source 210 is directed toward the scanning mirror 230 by a beam splitter 220 in the illustrated embodiment. It is contemplated, however, that light from the light source 210 could be differently directed to the scanning mirror 230. For example, a series of mirrors or partially reflecting optical elements could be used in some embodiments. Depending on the implementation of the LIDAR system 100, the beam splitter 220, also referred to as a beam splitting element 220, could be provided in a variety of forms, including but not limited to: a glass prism-based beam splitter component, a half-silver mirror-based beam splitter component, a dichroic mirror prism-based beam splitter component, a fiber-optic-based beam splitter component, and the like.

The subsystem 200 also includes a left detector 240, also referred to as a sensor 240 or a first detector 240. The detector 240 receives reflected light from the surroundings of the LIDAR system 100 thereon. Specifically, the scanning mirror 230 direct a first reflected light beam received thereon from the scanning prism 120 to the detector 240, via the beam splitter 220, the first reflected light beam being light from the first scanned light beam being incident on and reflected from surrounding objects.

The reflected light beam is the light beam from the light source 210, directed by the mirror 230 and the prism 120, reflected or scattered back to the LIDAR system 100 from one or more objects. As certain non-limiting examples, the objects could include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

The right illumination-detection subsystem 300, also referred to as a second subsystem 300, is disposed in the housing 110 generally to the right of the longitudinal center line 102 of the housing 110. It is contemplated, however, that some components or portions thereof of the subsystem 300 could extend onto the left side of the housing 110. The different components of the subsystem 300 are described herein, although it is noted that the subsystem 300 is generally a comparable, mirror image of the subsystem 200.

The subsystem 300 includes a second light source 310 disposed in a right side of the housing 110. In the present embodiment, the light source 310 is a laser source 310 but the specific details for any given embodiment could vary.

The subsystem 300 includes a second scanning mirror 330 disposed in the housing 110, specifically in a forward, right portion of the housing 110. Specifically, the scanning window 116 is disposed forward of the scanning mirror 330, although the specific amount of overlap could vary. In the illustrated embodiment, the scanning mirror 330 is a galvanometer-based scanning mirror, also referred to as a galvo mirror 230. It is contemplated that the scanning mirror 330 could be implemented in various forms. In certain non-limiting embodiments of the present technology, the scanning mirror 330 may further include a variety of other optical components and/or mechanical-type components for performing the scanning of the output beam from the light source 310. For example, the scanning mirror 330 may include one or more mirrors, prisms, lenses, MEM components, piezoelectric components, optical fibers, splitters, diffractive elements, collimating elements, and the like. It should be noted that the scanning mirror 330 may also include one or more additional actuators (not separately depicted) driving at least some of the other optical components to rotate, tilt, pivot, or move in an angular manner about one or more axes, for example.

The scanning mirror 330 is arranged to receive a light beam, also referred to as a second light beam, from the light source 310 and scan the light beam along a vertical axis, onto the scanning prism 120. The combined motion of the scanning mirror 330 and the scanning prism 120 then scans the light across a generally rectangular grid over the area surrounding the LIDAR system 100. Depending on the particular embodiment, the scan area of the output beams from the first subsystem 200 and the scan area of the output beams from the second subsystem 300 could overlap by varying degrees.

Light from the light source 310 is directed toward the scanning mirror 330 by a beam splitter 320 in the illustrated embodiment. It is contemplated, however, that light from the light source 310 could be differently directed to the scanning mirror 330. For example, a series of mirrors or partially reflecting optical elements could be used in some embodiments. Depending on the implementation of the subsystem 300, the beam splitter 320, also referred to as a beam splitter 320, could be provided in a variety of forms as is mentioned above for the beam splitter 220.

The subsystem 300 also includes a right detector 340, also referred to as a sensor 340 or a second detector 340. The detector 340 receives reflected light from the surroundings of the LIDAR system 100 thereon. Specifically, the scanning mirror 330 direct a second reflected light beam received thereon from the scanning prism 120 to the detector 340, via the beam splitter 320, the second reflected light beam being generally light from the second scanned light beam being incident on and reflected from surrounding objects. The surrounding objects are not especially limiting, as is set out above.

With continued reference to FIGS. 2 and 3, the LIDAR system 100 further includes an adjustable blocking element 150 connected to the housing 110. In the illustrated embodiment, the adjustable blocking element 150 is disposed on an exterior of the housing 110, although it is contemplated that the adjustable blocking element 150 could be positioned on an interior of the housing 110.

The adjustable blocking element 150 is disposed laterally between the first scanning window 114 and the second scanning window 116. As can be seen in the Figures, the blocking element 150 is disposed forward of the scanning prism 120, which is in turn disposed at least partially between the first scanning mirror 230 and the second scanning mirror 330. The adjustable blocking element 150 is arranged to selectively block an inner edge portion of the scanning window 114, on a left side thereof, and an inner edge portion of the scanning window 116, on a right side thereof.

Specifically, the adjustable blocking element 150 includes a right blade 154 and a left blade 156, each selectively connected to a portion of the housing body 115 extending between the windows 114, 116. Each of the blade 154, 156 is selectively laterally adjustable with respect to the housing body 115. In the illustrated embodiment, screws (not shown) are included to selectively affix the blade 154, 156 in the selected position. The adjustable blocking element 150 is selectively positionable between a retracted position (FIG.

2) with the blades 154, 156 in their most central position and an extended position (FIG. 3) with the blades 154, 156 in their most laterally outward position (right-most and left-most respectively), as well as any number of intermediate positions. It is contemplated that the adjustable blocking element 150 could include additional or alternative components for selectively positioning the blocking element 150.

The adjustable blocking element 150 thus has a selectively adjustable width for selectively blocking a portion of one or both of the reflected beams incident on the prism 120 and directed toward the subsystems 200, 300. The adjustable blocking element 150 thus selectively reduces light entering the area of the opening windows 114, 116 of the housing 110, to aid in reducing inter-channel interference, specifically by blocking at least some rays that are close to, but slightly deviated from, the angular spread for the light emitted by a given channel and reflected back to that same channel. The blocking element 150 generally intercepts some rays propagated in from an overlapping region of the two channels. It is also contemplated that one or more adjustable blocking elements could be included in positions other than the center position of the blocking element 150.

The LIDAR system 100 further includes two additional blocking elements 290, 390, one disposed to block rays in each of the subsystems 200, 300. The system 100 includes a left blocking element 290, also referred to as a first blocking element 290, partially surrounding the left scanning mirror 230. The system 100 also includes a right element 390, also referred to as a second blocking element 390, at least partially surrounding the right scanning mirror 230. The elements 290, 390 are arranged to aid in blocking stray light rays from surroundings from reaching the corresponding scanning mirror 230, 330 via the windows 114, 116.

Specifically, the first blocking element 290 is disposed, generally longitudinally, between the window 114 and the scanning mirror 230, such that the element 290 is configured to block stray light from an exterior of the housing 110 from being incident on the scanning mirror 230. Similarly, the second blocking element 390 is disposed between the window 116 and the scanning mirror 330, such that the second blocking element 390 is configured to block stray light from the exterior of the housing 110 from being incident on the scanning mirror 330.

The elements 290, 390 aid in blocking stray light rays that may enter through the windows 114, 116 and reach the mirrors 230, 330 from the sides, rather than via the scanning prism 120. This allows the windows 114, 116 to be larger to accept a large angle of ray incoming onto the scanning prism 120, while aiding in noise reduction compared to a fully exposed scanning mirror 230, 330.

Figure 4:
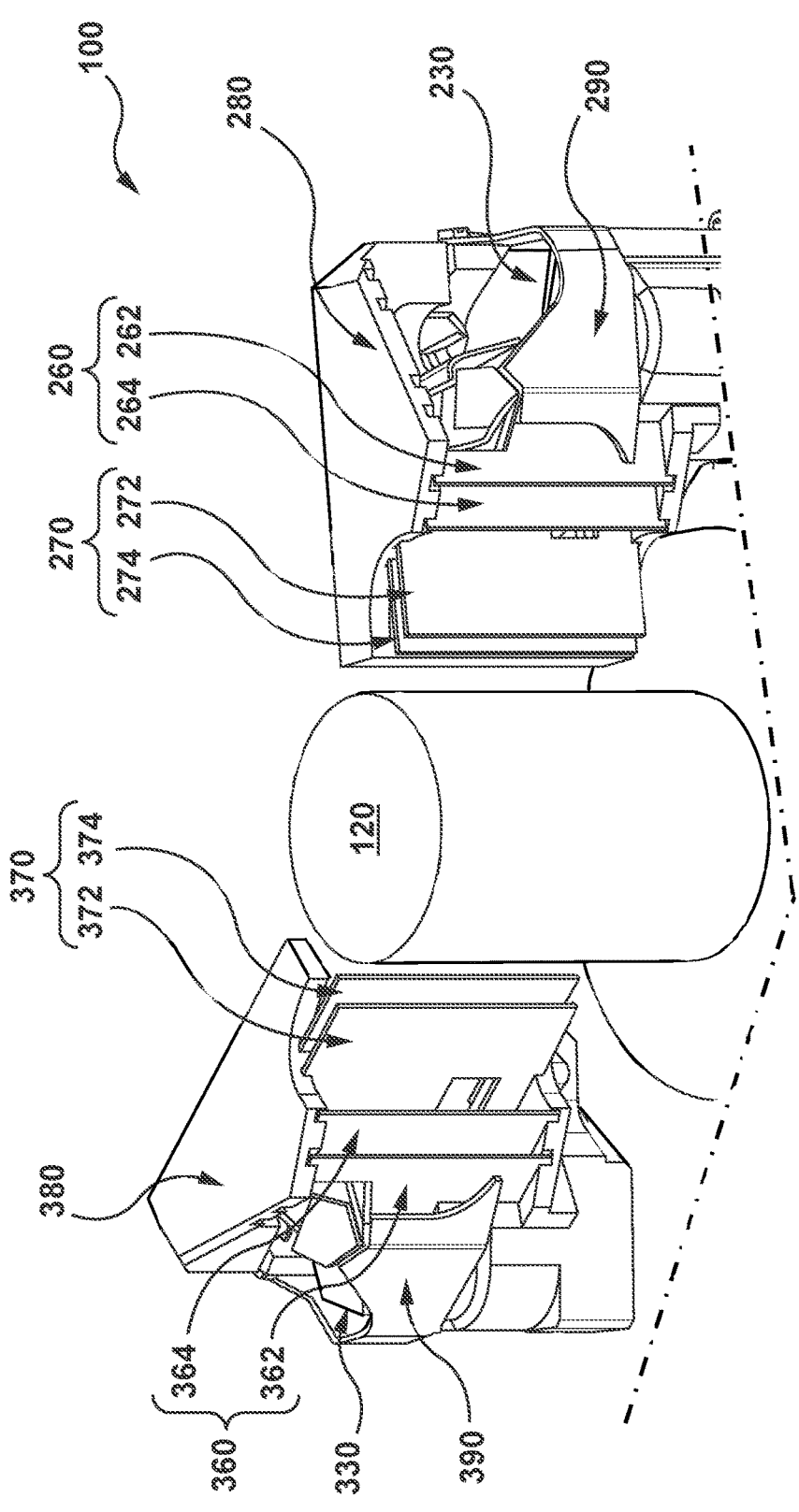
FIG. 4 is a top, front, left side perspective view of the LIDAR system of FIG. 1, with a housing of the system removed.

As is illustrated, the elements 290, 390 have a partial hexagonal form, wrapped around at least a portion of the corresponding mirror 230, 330 (see FIG. 5), with varying height about the mirrors 230, 330 (see FIG. 4). It is contemplated of course, that the exact shape of the blocking elements 290, 390 could vary depending on the particular embodiment. The shape of the blocking elements 290, 390 are generally chosen based on different geometric features of the particular embodiment and available space in the particular system 100.

The LIDAR system 100 further includes a series of baffle plates to aid in reducing inter-channel interference. Each subsystem 200, 300 includes a plurality of baffle plates, also referred to as baffles, disposed between the corresponding scanning mirror 230, 330 and the prism 120.

The subsystem 200 includes a pair of first inner baffles 270 and a pair of first outer baffles 260 disposed laterally between the scanning prism 120 and the scanning mirror 230, the outer baffles 260 being disposed forward of the inner baffle plates 270. The subsystem 300 includes a pair of second inner baffles 370 and a pair of second outer baffles 360 disposed laterally between the scanning prism 120 and the scanning mirror 330, the outer baffles 360 being disposed forward of the inner baffle plates 270.

The pair of baffles 270 of the subsystem 200 includes a shorter baffle 272 and a longer baffle 274 disposed slightly rearward of the baffle 272. The pair of baffles 260 of the subsystem 200 includes a shorter baffle 262 and a longer baffle 264 disposed slightly rearward of the baffle 262. In at least some embodiments, it is contemplated that the pair of baffles 270 and/or the pair of baffles 260 could be replaced by just one of the baffles 262, 264 or the baffles 272, 274 respectively.

Similarly, the pair of baffles 370 of the subsystem 300 includes a shorter baffle 372 and a longer baffle 374 disposed slightly rearward of the baffle 372. The pair of baffles 360 of the subsystem 300 includes a shorter baffle 362 and a longer baffle 364 disposed slightly rearward of the baffle 362. In at least some embodiments, it is contemplated that the pair of baffles 370 and/or the pair of baffles 360 could be replaced by just one of the baffles 362, 364 or the baffles 372, 374 respectively. It should be noted that the indications "shorter" and "longer" describing the baffles are only meant to designate their length relative to each other.

Figure 5:
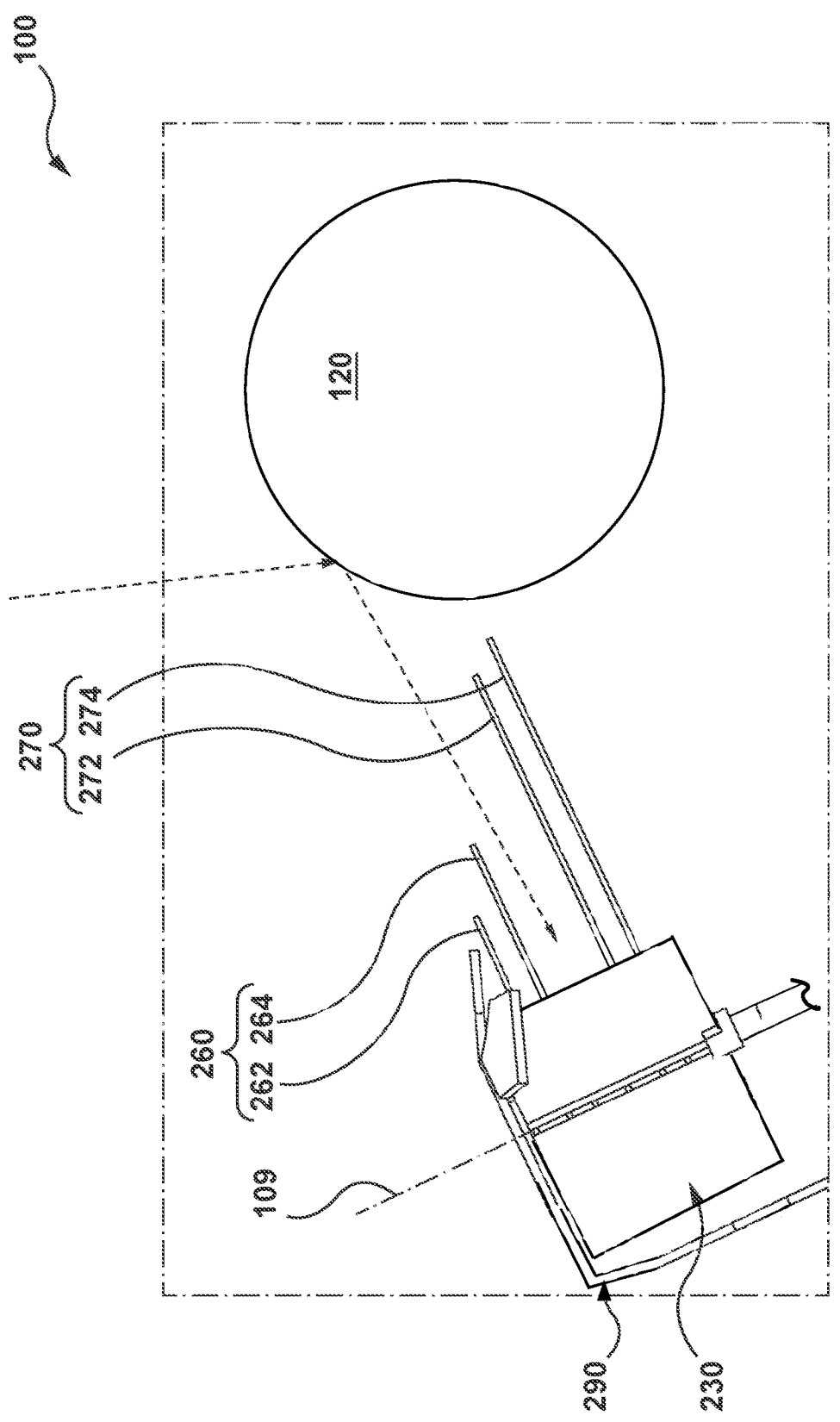
FIG. 5 is a top, partial, cross-sectional view of a forward, left portion of the LIDAR system of FIG. 1.

As is illustrated in FIG. 5, the baffle plates 262, 264, 272, 274 extend perpendicularly to an axis of rotation 109 of the scanning mirror 230. Similarly, the baffle plates 362, 364, 372, 374 extend perpendicularly to an axis of rotation (not shown) of the scanning mirror 330. In such an arrangement, rays within a small angular range of the intended ray path (i.e. the path of rays emanating from and returning to a same channel) propagate without interference. Rays near, but not exactly aligned with, the intended ray path may be blocked by one of the baffles. This aids in reducing inter-channel interference.

The first inner baffle plates 272, 274 and the first outer baffle plates 262, 264 are thus arranged to at least partially block stray light from the second light source 310 from reaching the first scanning mirror 230. The second inner baffle plates 372, 374 and the second outer baffle plates 362, 364 are similarly arranged to at least partially block stray light from the first light source 210 from reaching the second scanning mirror 330.

As can be seen in FIG. 4, the system 100 includes two baffle racks for supporting the baffles in the housing 110. The subsystem 200 includes a first baffle rack 280 supporting the pair of first inner baffle plates 260 and the pair of first outer baffle plates 270. The subsystem 300 includes a second baffle rack 380 supporting the pair of second inner baffle plates 360 and the pair of second outer baffle plates 370. Depending on the particular embodiment, different mechanical supports could be used to support the various baffles.

Figure 6:
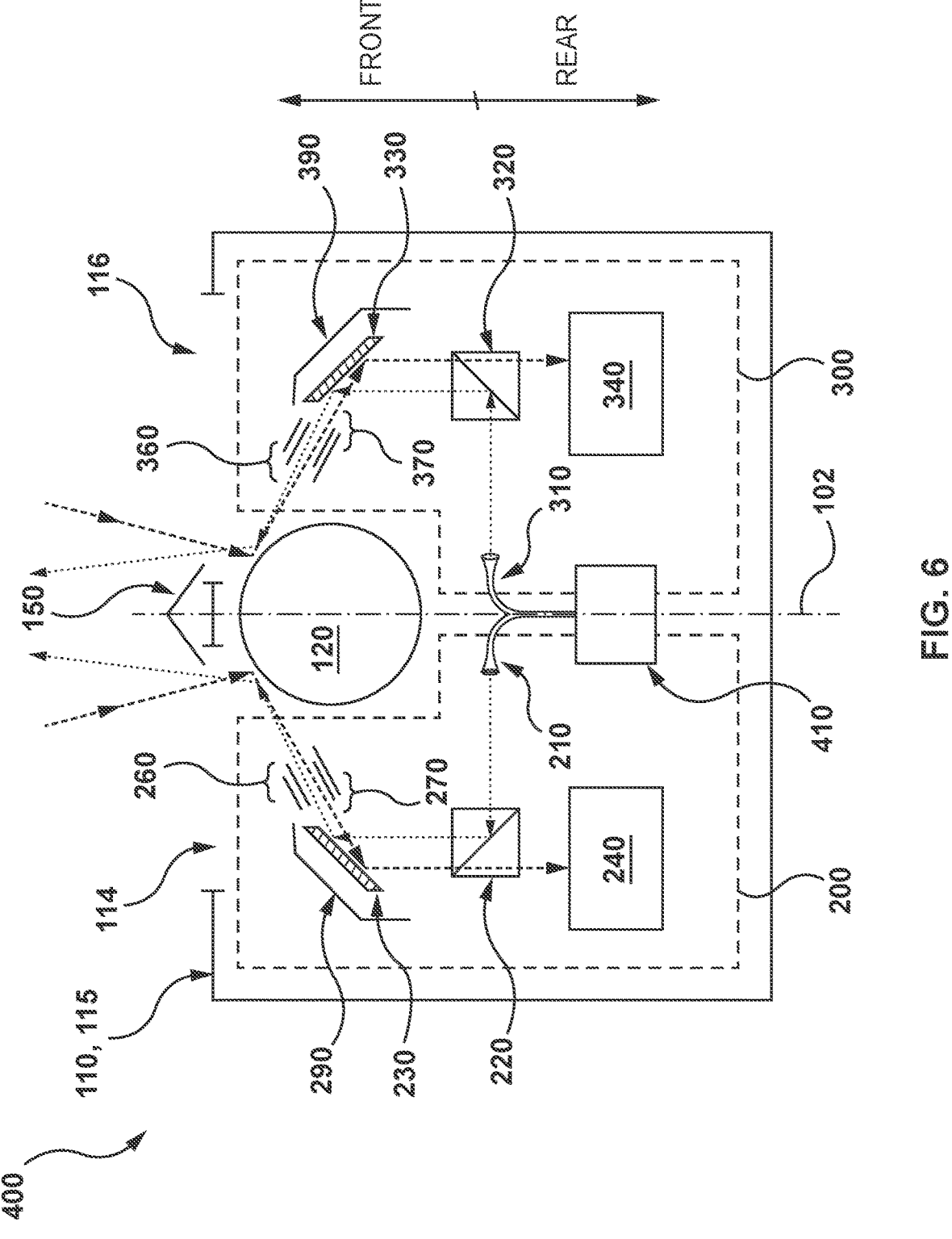
FIG. 6 is a schematic view of another non-limiting embodiment of a LIDAR system of the present technology.

With reference to FIG. 6, another non-limiting embodiment of a LIDAR system 400 is illustrated. Elements of the system 400 that are similar to those of the system 100 retain the same reference numeral and will generally not be described again.

The system 400 includes a single laser source 410 which provides the illumination to both of the subsystems 200, 300. As is illustrated schematically, the light source 410 is split into two beams (by a fiber coupler in the illustration) and thus forms both the first light source 210 and the second light source 310. In such an arrangement, light of the first light source 210 is thus generated by the laser source 410 and light of the second light source 310 is generated by the laser source 410.

For the above descriptions, the light sources 210, 310, or the light source 410 in other embodiments, could be implemented in a variety of ways. The light sources 210, 310, 410 is configured to emit light having a given operating wavelength. To that end, in certain non-limiting embodiments of the present technology, the light sources could include at least one laser pre-configured for operation at the given operating wavelength. The given operating wavelength of the light sources 210, 310, 410 may be in the infrared, visible, and/or ultraviolet portions of the electromagnetic spectrum. For example, the light sources 210, 310, 410 may include at least one laser with an operating wavelength between about 650 nm and 1150 nm. Alternatively, the light sources 210, 310, 410 may include a laser diode configured to emit light at a wavelength between about 800 nm and about 1000 nm, between about 850 nm and about 950 nm, or between about 1300 nm and about 1600 nm. In certain other embodiments, the light sources 210, 310, 410 could include a light emitting diode (LED).

The light sources 210, 310, 410 of the LiDAR system 100, 400 is generally an eye-safe laser, or put another way, the LiDAR system 100, 400 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

The light sources 210, 310, 410 could include a pulsed laser configured to produce, emit, or radiate pulses of light with a certain pulse duration. For example, in some non-limiting embodiments of the present technology, the light sources 210, 310, 410 may be configured to emit pulses with a pulse duration (e.g., pulse width) ranging from 10 µs to 100 ns. In other non-limiting embodiments of the present technology, the light sources 210, 310, 410 may be configured to emit pulses at a pulse repetition frequency of approximately 100 kHz to 5 MHz or a pulse period (e.g., a time between consecutive pulses) of approximately 200 ns to 10 µs. Overall, however, the light sources 210, 310, 410 could generate the output beam 314 with any suitable average optical power, and the output beam 314 may include optical pulses with any suitable pulse energy or peak optical power for a given application.

In some non-limiting embodiments of the present technology, the light sources 210, 310, 410 could include one or more laser diodes, including but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light sources 210, 310, 410 may be an aluminum-gallium-arsenide (Al-GaAs) laser diode, an indium-gallium-arsenide (InGaAs) laser diode, or an indium-gallium-arsenide-phosphide (In-GaAsP) laser diode, or any other suitable laser diode. It is also contemplated that the light sources 210, 310, 410 may include one or more laser diodes that are current modulated to produce optical pulses.

In some non-limiting embodiments of the present technology, the light sources 210, 310, 410 is generally configured to emit output beams in collimated form, but it is contemplated that the beam produced could have any suitable beam divergence for a given application. Broadly speaking, divergence of an output beam is an angular measure of an increase in beam cross-section size (e.g., a beam radius or beam diameter) as an output beam travels away from the light sources 210, 310, 410 or the LiDAR system 100, 400. In some non-limiting embodiments of the present technology, output beams may have a substantially circular cross-section.

It is also contemplated that the output beams emitted by light sources 210, 310, 410 could be unpolarized or randomly polarized, could have no specific or fixed polarization (e.g., the polarization may vary with time), or could have a particular polarization (e.g., the output beams may be linearly polarized, elliptically polarized, or circularly polarized).

For the above descriptions, the detectors 240, 340 could be implemented in various ways. It is contemplated that, in various non-limiting embodiments of the present technology, the detectors 240, 340 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the detectors 240, 340 may also include circuitry that performs signal amplification, sampling, filtering, signal conditioning, analog-to-digital conversion, time-to-digital conversion, pulse detection, threshold detection, rising-edge detection, falling-edge detection, and the like. For example, the detectors 240, 340 may include electronic components configured to convert a received photocurrent (e.g., a current produced by an APD in response to a received optical signal) into a voltage signal. The detectors 240, 340 may also include additional circuitry for producing an analog or digital output signal that corresponds to one or more characteristics (e.g., rising edge, falling edge, amplitude, duration, and the like) of a received optical pulse.

Depending on the implementation, the LIDAR system 100, 400 may include one or more controllers, one or more processors, an application-specific integrated circuit (ASIC), a field-programmable gate array (FPGA), and/or other suitable circuitry. The system 100, 400 may also include non-transitory computer-readable memory to store instructions executable by a controller as well as data which a controller may produce based on the signals acquired from other internal components of the system 100, 400 and/or may provide signals to the other internal components of the LiDAR system 100, 400. The memory can include volatile (e.g., RAM) and/or non-volatile (e.g., flash memory, a hard disk) components. A controller may be configured to generate data during operation and store it in the memory.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A two-channel LIDAR system, comprising:
a housing;
a first subsystem disposed in the housing, the first subsystem comprising:
  a first light source,
  a first detector, and a first scanning mirror disposed in the housing, the first scanning mirror being arranged to:
  receive a first light beam from the first light source and scan the first light beam in a first axial direction, and
  direct a first reflected light beam received thereon to the first detector, the first reflected light beam being light from the first light beam being incident on and reflected from surrounding objects;
a second subsystem disposed in the housing, the second subsystem comprising:
  a second light source,
  a second detector, and
  a second scanning mirror disposed in the housing arranged to:
    receive a second light beam from the second light source and scan the second light beam in the first axial direction, and
    direct a second reflected light beam received thereon to the second detector, the second reflected light beam being light from the second light beam being incident on and reflected from surrounding objects;
a scanning prism disposed in a forward, central portion of the housing at least partially between the first scanning mirror and the second scanning mirror,
  the scanning prism being arranged to scan light from the first scanning mirror and the second scanning mirror incident thereupon in a second axial direction;
an adjustable blocking element connected to the housing, the adjustable blocking element being disposed forward of the scanning prism,
  the adjustable blocking element having a selectively adjustable width for selectively reducing light entering the housing;
at least one first inner baffle plate disposed laterally between the scanning prism and the first scanning mirror;
at least one first outer baffle plate disposed laterally between the scanning prism and the first scanning mirror, the at least one first outer baffle plate being disposed forward of the at least one first inner baffle plate;
at least one second inner baffle plate disposed laterally between the scanning prism and the second scanning mirror; and
at least one second outer baffle plate disposed laterally between the scanning prism and the second scanning mirror, the at least one second outer baffle plate being disposed forward of the at least one first inner baffle plate.

2. The system of claim 1, wherein:
the housing comprises:
  a housing body;
  a first scanning window defined in the housing body, the first scanning window being disposed forward of the first scanning mirror, and
  a second scanning window defined in the housing body, the second scanning window being disposed forward of the second scanning mirror; and
the adjustable blocking element is disposed laterally between the first scanning window and the second scanning window.

3. The system of claim 2, wherein the housing body is formed from opaque material to block stray light.

4. The system of claim 2, wherein the adjustable blocking element is arranged to selectively block:

15 an inner edge portion of the first scanning window; and an inner edge portion of the second scanning window.

5. The system of claim 2, further comprising:

a first blocking element at least partially surrounding the first scanning mirror; and a second blocking element at least partially surrounding the second scanning mirror.

6. The system of claim 1, wherein the adjustable blocking element is selectively positionable in at least:

a retracted position; and an extended position.

7. The system of claim 5, wherein:

the first blocking element is disposed between the first scanning window and the first scanning mirror;

the first blocking element is configured to block stray light from an exterior of the housing from being incident on the first scanning mirror;

the second blocking element is disposed between the second scanning window and the second scanning mirror; and the second blocking element is configured to block stray light from the exterior of the housing from being incident on the second scanning mirror.

8. The system of claim 1, wherein:

the at least one first inner baffle plate and the at least one first outer baffle plate extend perpendicularly to an axis of rotation of the first scanning mirror; and the at least one second inner baffle plate and the at least one second outer baffle plate extend perpendicularly to an axis of rotation of the second scanning mirror.

9. The system of claim 1, wherein:

the at least one first inner baffle plate includes a pair of first inner baffle plates;

the at least one first outer baffle plate includes a pair of first outer baffle plates;

the at least one second inner baffle plate includes a pair of first inner baffle plates; and

16 the at least one second outer baffle plate includes a pair of second outer baffle plates.

10. The system of claim 9, further comprising:

a first baffle rack supporting the pair of first inner baffle plates and the pair of first outer baffle plates; and a second baffle rack supporting the pair of second inner baffle plates and the pair of second outer baffle plates.

11. The system of claim 1, wherein:

the at least one first inner baffle plate includes a first shorter inner baffle plate and a first longer inner baffle plate;

the at least one first outer baffle plate includes a first shorter outer baffle plate and a first longer outer baffle plate;

the at least one second inner baffle plate includes a second shorter inner baffle plate and a second longer inner baffle plate; and the at least one second outer baffle plate includes a second shorter outer baffle plate and a second longer outer baffle plate.

12. The system of claim 1, wherein:

the at least one first inner baffle plate and the at least one first outer baffle plate are arranged to at least partially block stray light from the second light source from reaching the first scanning mirror; and the at least one second inner baffle plate and the at least one second outer baffle plate are arranged to at least partially block stray light from the first light source from reaching the second scanning mirror.

13. The system of claim 1, further comprising:

a laser source disposed in the housing; and wherein:

light of the first light source is generated by the laser source, and light of the second light source is generated by the laser source.

* * * * *